United States Patent
Kamepalli et al.

(10) Patent No.: US 7,546,472 B2
(45) Date of Patent: Jun. 9, 2009

(54) INFORMATION HANDLING SYSTEM THAT SUPPLIES POWER TO A MEMORY EXPANSION BOARD

(75) Inventors: Srinivas Rao Kamepalli, Austin, TX (US); Ajay Kwatra, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 11/107,176

(22) Filed: Apr. 15, 2005

(65) Prior Publication Data

US 2006/0236134 A1  Oct. 19, 2006

(51) Int. Cl.
*G06F 1/00* (2006.01)
*G06F 11/00* (2006.01)
*G06F 15/177* (2006.01)

(52) U.S. Cl. .............................. 713/300; 713/1; 714/36
(58) Field of Classification Search ................. 713/300, 713/1, 2, 340; 714/36
See application file for complete search history.

(56) References Cited

U.S. PATENT DOCUMENTS

| | | | | |
|---|---|---|---|---|
| 5,203,004 A | * | 4/1993 | Bunton et al. | 713/340 |
| 5,963,023 A | * | 10/1999 | Herrell et al. | 323/265 |
| 6,005,769 A | * | 12/1999 | Cho | 361/686 |
| 6,363,450 B1 | * | 3/2002 | Lash et al. | 710/301 |

OTHER PUBLICATIONS

Patriot Memory, PSD21G5332EFB, 2005.*
The PC Guide, I have a new or recently-upgraded system and my system memory appears to have failed or is not working in general, Apr. 17, 2001.*
AndreL, SDR Ram & DDR Ram 'the 'ol switcherooo', Sep. 27, 2004.*

* cited by examiner

*Primary Examiner*—Mark Connolly
(74) *Attorney, Agent, or Firm*—Haynes and Boone, LLP

(57) ABSTRACT

An information handling system ("IHS") including a processor, a memory controller coupled to the processor, and a memory device interface coupled to the memory controller is provided. The IHS also includes a voltage control circuit, coupled to the interface, for determining whether the interface is coupled to a memory expansion board or a memory device. In response to determining that the interface is coupled to a memory device, the circuit activates a first voltage regulator for supplying a first level of voltage. In response to determining that the interface is coupled to a memory expansion board, the circuit activates a second voltage regulator for supplying a second level of voltage.

6 Claims, 4 Drawing Sheets

INFORMATION HANDLING SYSTEM THAT SUPPLIES POWER TO A MEMORY EXPANSION BOARD

BACKGROUND

The description herein relates generally to information handling systems ("IHSs") and more particularly to an IHS that supplies power to a memory expansion board.

As the value and use of information continues to increase, individuals and businesses seek additional ways to process and store information. One option is an information handling system ("IHS"). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS typically includes at least one memory device. Various example types of a memory device include single in-line memory modules ("SIMMs") and double in-line memory modules ("DIMMs"). Fully-buffered DIMM ("FB-DIMM") is an example of DIMMs. FB-DIMM is capable of providing an IHS with a larger memory capacity. For example, a FB-DIMM memory controller having 4 channels are capable of supporting up to 16 FB-DIMMS.

In some implementations, the FB-DIMMS are coupled to a memory controller via an expansion board (e.g., a riser card). With conventional techniques, for example, supplying power via a power dongle, supplying power to such memory expansion board is less efficient.

What is needed is a method and an IHS for supplying power to a memory expansion board, without the disadvantages discussed above.

SUMMARY

Accordingly, a method and an information handling system ("IHS") are disclosed. The method includes determining whether a memory device interface is coupled to a memory expansion board or a memory device. Also, the method includes, in response to determining that the interface is coupled to a memory device, supplying a first level of voltage to the interface. The method further includes, in response to determining that the interface is coupled to a memory expansion board, supplying a second level of voltage to the interface.

DETAILED DESCRIPTION

For purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit ("CPU") or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
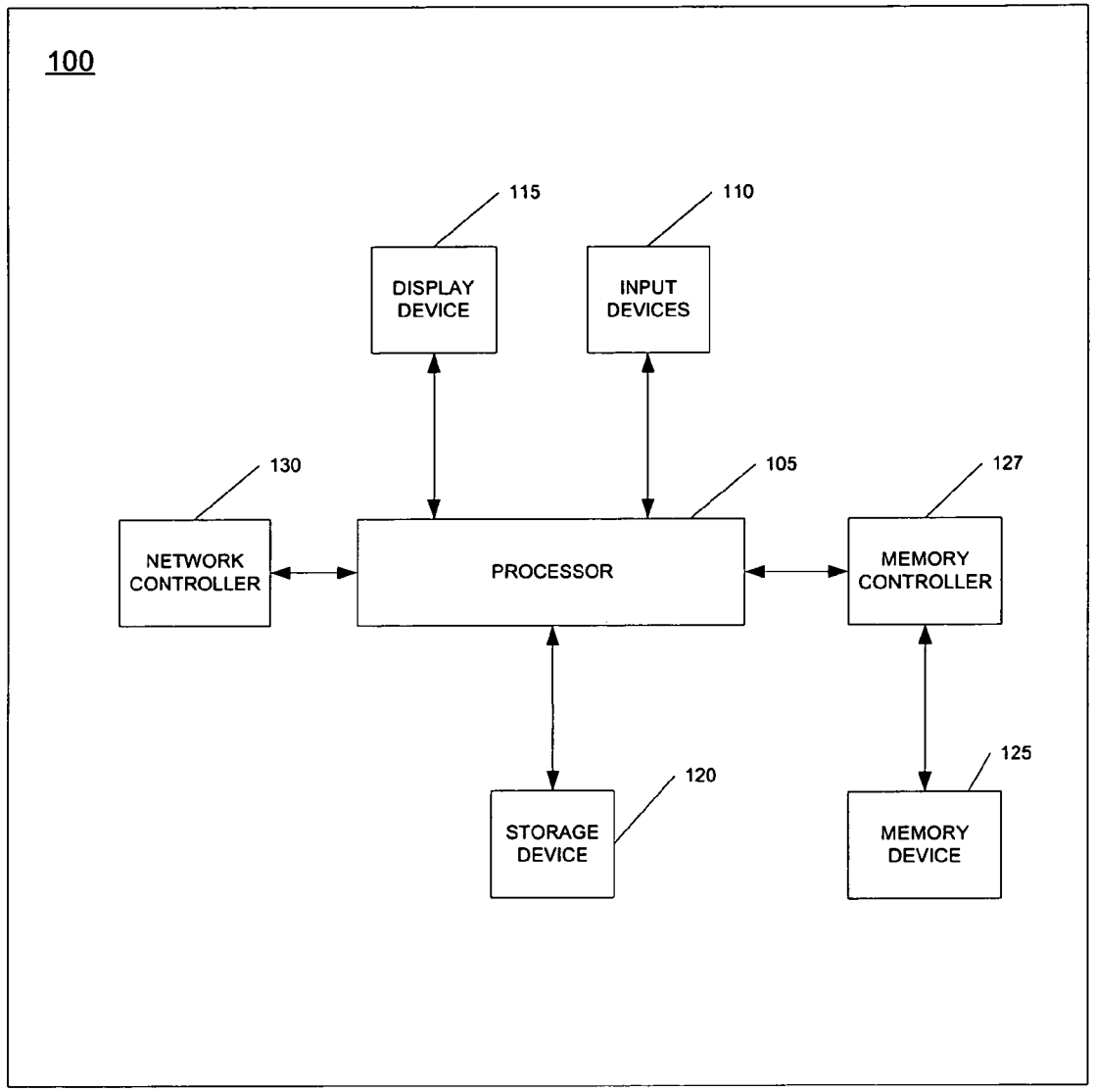
FIG. 1 is a block diagram of a portable information handling system ("IHS") according to an illustrative embodiment.

FIG. 1 is a block diagram of an IHS, indicated generally at 100, according to the illustrative embodiment. The IHS 100 includes a processor 105 (e.g., an Intel Pentium series processor) for executing and otherwise processing instructions, input devices 110 for receiving information from a human user, a display device 115 (e.g., a cathode ray tube ("CRT") device, a projector, a liquid crystal display ("LCD") device, or a plasma display device) for displaying information to the user, a storage device 120 (e.g., a non-volatile storage device such as a hard disk drive or other computer readable medium or apparatus) for storing information, a memory device 125 (e.g., random access memory ("RAM") device and read only memory ("ROM") device), also for storing information, a memory controller 127 for controlling information communicated between the memory device 125 and the processor 105, and a network controller 130 for communicating between the IHS 100 and a network. Examples of the memory device 125 include single in-line memory modules ("SIMMS") and double in-line memory modules ("DIMMS") such as fully-buffered DIMMs ("FB-DIMMs"). In the illustrative embodiment, the memory device 125 is a FB-DIMM. Accordingly, the memory controller 127 is a FB-DIMM memory controller.

Each of the input devices 110, the display device 115, the storage device 120, the memory device 125, the memory controller 127 and the network controller 130 is coupled to the processor 105, and to one another. More specifically, the memory device 125 is coupled to the processor 105 via the memory controller 127 as shown. Also, in one example, the IHS 100 includes various other electronic circuitry for performing other operations of the IHS 100, such as a print device (e.g., an ink-jet printer or a laser printer) for printing visual images on paper.

The input devices 110 include, for example, a conventional keyboard and a pointing device (e.g., a "mouse", a roller ball, or a light pen). A user operates the keyboard to input alphanumeric text information to the processor 105, and the processor receives such information from the keyboard. A user also operates the pointing device to input cursor-control information to the processor 105, and the processor 105 receives such cursor-control information from the pointing device.

Figure 2:
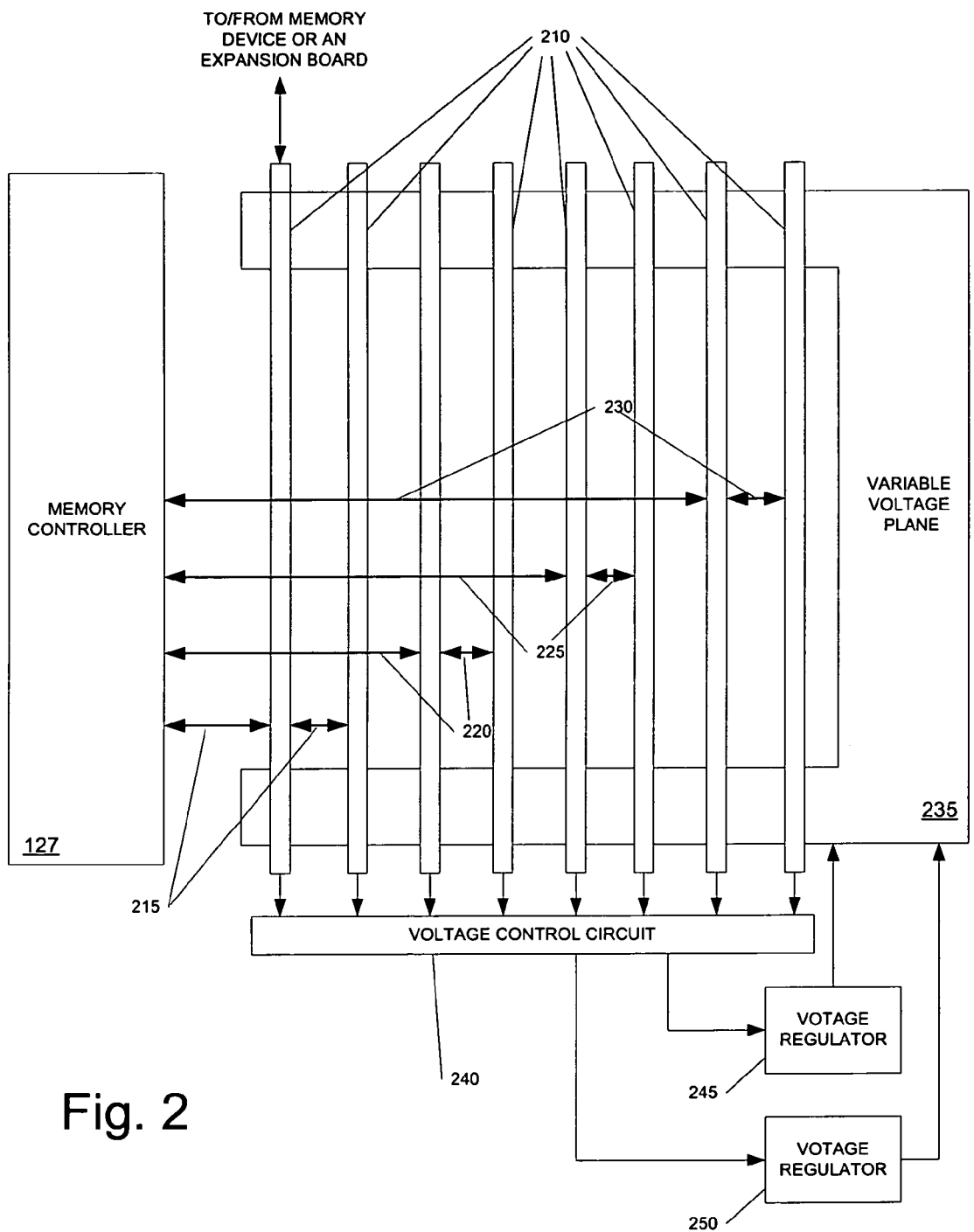
FIG. 2 is a block diagram depicting a memory controller of FIG. 1 coupled to memory device interfaces.

FIG. 2 is a block diagram illustrating the memory controller 127 of FIG. 1 coupled to memory device interfaces (e.g., memory slots or connectors) 210. Each of the memory device interfaces 210 is for coupling a memory device or an expansion board (e.g., a riser card) to the memory controller 127. Accordingly, via the interfaces 210, the memory controller 127 couples to memory devices and or expansion boards. More particularly, each of the interfaces 210 is coupled to the memory controller 127 via communication channels 215, 220, 225, and 230. As shown, via each of the channels 215, 220, 225, and 230 two memory interfaces are coupled to the memory controller 127.

Each of the interfaces 210 is coupled to a variable voltage plane 235. Each of the interfaces 210 is also coupled to a voltage control circuit 240. Also, the voltage circuit 240 is coupled to a voltage regulator 245 and a voltage regulator 250, each of which is coupled to the plane 235 for regulating voltage supplied on the plane 235.

As discussed above, each of the interfaces 210 is capable of being coupled to a memory device or a memory expansion board. Also, as discussed below in more detail in connection with FIG. 3, such expansion board is capable of including multiple memory devices. Accordingly, such expansion board increases the IHS 100's memory capacity.

A memory device consumes power (e.g., electric power) in performing its operations. Accordingly, via the variable voltage plane 235, each of the interfaces 210 receives power, which is supplied to expansion boards and memory devices coupled to the interfaces 210. Because it includes multiple memory devices, an expansion board consumes more power compared to a single memory device. Accordingly, in response to determining whether memory devices or expansion boards are coupled to the interfaces 210, the IHS 100 selectively supplies a variable amount of power to the interfaces 210. More particularly, the voltage control circuit varies the voltage supplied to the interfaces 210 by selectively switching between the voltage regulator 245 and the voltage regulator 250 as discussed in more detail below in connection with FIG. 4.

Figure 3:
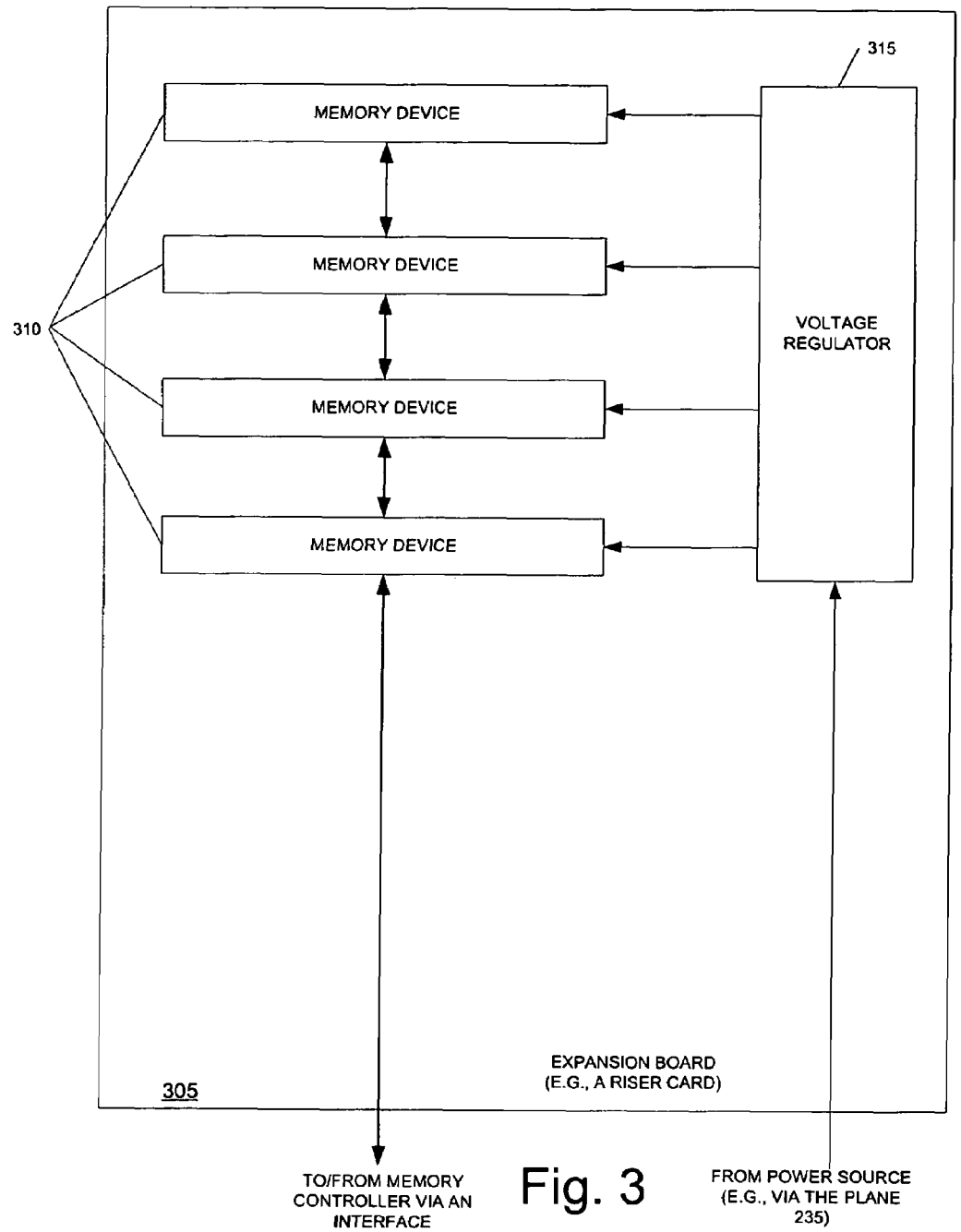
FIG. 3 is a block diagram of a memory expansion board, according to an illustrative embodiment.

FIG. 3 is a block diagram of an expansion board 305, according to an illustrative embodiment. The expansion board 305 includes memory devices 310. When the expansion board 305 is coupled to a memory interface (e.g., one of the interfaces 210 of FIG. 2), the memory devices 310 are coupled to a memory controller (e.g., the memory controller 127) via such interface.

The expansion board 305 also includes a voltage regulator 315 coupled to each of the memory devices 310. The voltage regulator 315 is also coupled to and receives voltage from a variable voltage plane (e.g., the variable voltage plane 235) as shown.

Figure 4:
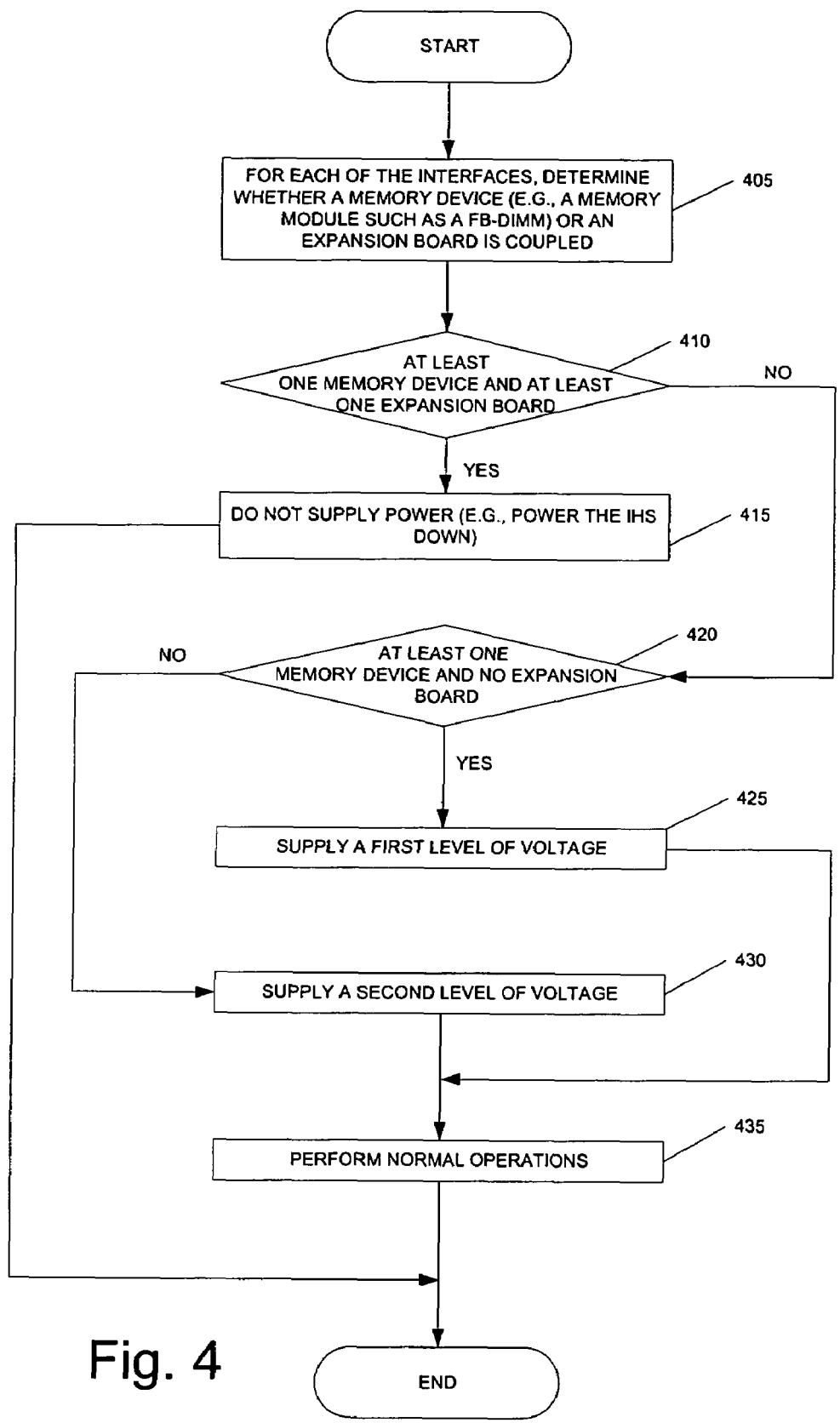
FIG. 4 is a flow chart of operations performed by the IHS of FIG. 1.

FIG. 4 is a flow chart of operations of the IHS 100 for supplying voltage to a memory expansion board. The following discussion simultaneously references FIGS. 2, 3 and 4. The operations begin at a step 405, where for each of the interfaces 210, the IHS 100 determines whether a memory device or an expansion board is coupled thereto. More particularly, for each of the interfaces 210, the voltage control circuit 240 is operable to make such determination. After the step 405, the operations continue to a step 410.

At the step 410, the IHS 100 determines whether at least one memory device and at least one expansion board is coupled to the interfaces 210. If so, the operations continue to a step 415.

At the step 415, the IHS 100 prevents power from being supplied to the interfaces 210. In the illustrative embodiment, the IHS 100 is incapable of operating if at least one memory device and at least one expansion board are both coupled directly to the interfaces 210. Accordingly, the IHS 100 powers itself down so that no power is supplied to the interfaces 210. After the step 415, the operations end.

Referring again to the step 410, if the IHS 100 determines otherwise, the operations continue to a step 420. At the step 420, the IHS 100 determines whether at least one memory device and no expansion board is coupled to the interfaces 210. If so, the operations continue to a step 425.

At the step 425, the IHS 100 supplies a first level of voltage to the interfaces 210 (and to the at least one memory device). More particularly, the voltage control circuit 240 selectively supplies the first level of voltage by activating the voltage regulator 245 and deactivating the voltage regulator 250 so that the plane 235 supplies the first level of voltage. The first level of voltage supplied via the voltage regulator 245 is suitable for a memory device. In one example, such voltage is approximately 1.8 volts, which is a conventional level of voltage suitable for a FB-DIMM. Accordingly, the voltage regulator 245 outputs approximately 1.8 volts. After the step 425, the operations continue to a step 435, where the IHS performs its normal operations. After the step 435, the operations end as shown.

Referring again to the step 420, if the IHS 100 determines otherwise, it indicates that at least one memory expansion board and no memory device is coupled to the interfaces 210. Accordingly, the operations continue to a step 430.

At the step 430, the IHS 100 supplies a second level of voltage to the interfaces 210 (and to the at least one expansion board). More particularly, the voltage control circuit 240 selectively supplies the second level of voltage by activating the voltage regulator 250 and deactivating the voltage regulator 245 so that the second level of voltage is supplied via the plane 235. The second level of voltage supplied via the voltage regulator 250 is suitable for a memory expansion board and thus for multiple memory devices. As discussed above, a memory expansion board is capable of including multiple memory devices. Such multiple memory devices require and consume more power than a single memory device to perform its operations. Accordingly, in one example, the second level of voltage is approximately 12 volts, which is suitable for a memory expansion board capable of supporting four (4) FB-DIMMs. Accordingly, the voltage regulator 250 outputs approximately 12 volts. After the step 430, the operations continue to the step 435, where the IHS 100 performs its normal operations. After the step 435, the operations end.

The IHS 100 reduces (e.g., by down-regulating) the second level of voltage, supplied to an expansion board at the step 430, and supplies such reduced level of voltage to memory devices included in the expansion board. Referring again to Fig 3, the voltage regulator 315 receives a level of voltage (e.g., the second level supplied in the step 430) suitable for the expansion board 305 and its multiple memory devices. The voltage regulator 315 down-regulates such voltage and supplies the down-regulated voltage to each of the memory devices 310. In one example, the voltage regulator receives approximately 12 volts, down-regulates such voltage to approximately 1.8 volts, and supplies such voltage to each of the memory devices 310.

Although illustrative embodiments have been shown and described, a wide range of modification, change and substitution is contemplated in the foregoing disclosure. Also, in some instances, some features of the embodiments may be employed without a corresponding use of other features.

Accordingly, it is appropriate that the appended claims be constructed broadly and in manner consistent with the scope of the embodiments disclosed herein.

What is claimed is:

1. An information handling system comprising:
   a processor;
   a memory controller, coupled to the processor;
   a memory device interface, coupled to the memory controller; and
   a voltage control circuit, coupled to the interface, for:
      determining whether the interface is coupled to a memory expansion board or a memory device;
      in response to determining that the interface is coupled to a memory device, activating a first voltage regulator for supplying a first level of voltage to a variable voltage plane coupled with the interface;
      in response to determining that the interface is coupled to a memory expansion board, activating a second voltage regulator for supplying a second level of voltage to the variable voltage plane coupled with the interface; and
      in response to determining that the interface is coupled to both a memory device and a memory expansion board, powering down the information handling system.

2. The system of claim 1, wherein the first level of voltage is suitable for a memory device.

3. The system of claim 1, wherein the second level of voltage is suitable for a memory expansion board.

4. The system of claim 3, wherein the second level of voltage is down-regulated by a voltage regulator included on a memory expansion board.

5. The system of claim 1, wherein the memory device is a fully buffered dual in-line memory module ("FB-DIMM").

6. The system of claim 1, wherein the first voltage regulator outputs approximately 1.8 volts and the second voltage regulator outputs approximately 12 volts.

* * * * *